Figure 1:
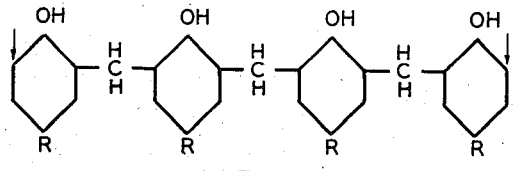
Figure 2:
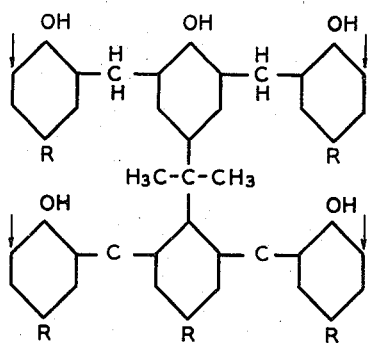
Figure 3:
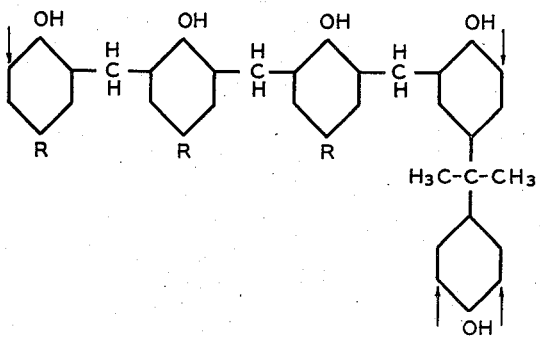
Figure 4:
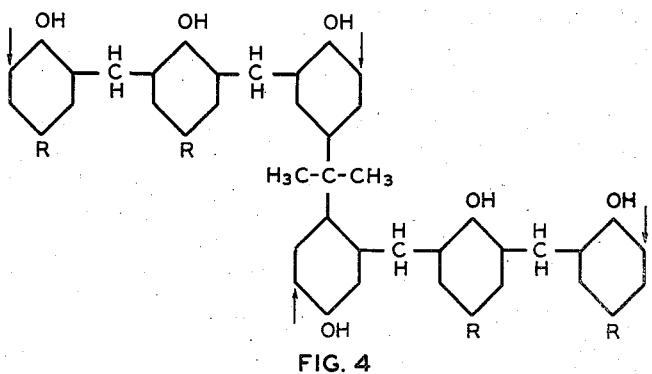

Sept. 30, 1958  M. DE GROOTE  2,854,415
PROCESS FOR BREAKING PETROLEUM EMULSIONS EMPLOYING CERTAIN
AMINE-MODIFIED THERMOPLASTIC PHENOL-ALDEHYDE RESINS
Filed Aug. 6, 1954

INVENTOR
Melvin De Groote

United States Patent Office 2,854,415
Patented Sept. 30, 1958

2,854,415
PROCESS FOR BREAKING PETROLEUM EMULSIONS EMPLOYING CERTAIN AMINE-MODIFIED THERMOPLASTIC PHENOL-ALDEHYDE RESINS

Melvin De Groote, University City, Mo., assignor to Petrolite Corporation, Wilmington, Del., a corporation of Delaware Application August 6, 1954, Serial No. 448,173

9 Claims. (Cl. 252—344)

This invention relates to processes or procedures particularly adapted for preventing, breaking or resolving emulsions of the water-in-oil type, and particularly petroleum emulsions.

My invention provides an economical and rapid process for resolving petroleum emulsions of the water-in-oil type that are commonly referred to as "cut oil," "roily oil," "emulsified oil," etc., and which comprise fine droplets of naturally-occurring waters or brines dispersed in a more or less permanent state throughout the oil which constitutes the continuous phase of the emulsion.

It also provides an economical and rapid process for separating emulsions which have been prepared under controlled conditions from mineral oil, such as crude oil and relatively soft waters or weak brines. Controlled emulsification and subsequent demulsification under the conditions just mentioned are of significant value in removing impurities particularly inorganic salts, from pipeline oil.

Attention is directed to my co-pending applications, Serial Numbers 288,742, through 288,746, inclusive, filed May 19, 1952, all now abandoned. The first of said co-pending applications relates to a process of condensing certain phenol-aldehyde resins derived from phenols having a functionality not greater than 2, therein and hereinafter described in detail, with certain basic nonhydroxylated secondary monoamines, also therein described in detail, and formaldehyde.

The second application is similar to the first except that the monoamines employed as reactants are hydroxylated instead of being nonhydroxylated. The third application is similar to the first one insofar that nonhydroxylated polyamines are employed as reactants. The fourth application is concerned with hydroxylated polyamines as reactants and the last application is concerned with amines having a cyclic amidine group in the reactant regardless of whether it is hydroxylated or not.

The present application is differentiated from the aforementioned five applications in that the resin employed instead of being difunctional towards formaldehyde is tetrafunctional towards formaldehyde. Stated another way this invention is concerned with a process of breaking petroleum emulsions employing a demulsifier including a synthetic hydrophile product obtained by condensing certain phenol-aldehyde resins derived from a mixture of (A) phenols having a functionality not greater than two, and (B) a tetra-functional bisphenol, which are hereinafter described in detail, with certain basic secondary amines, also hereinafter described in detail, and formaldehyde.

The manufacture of oxyalkylation-susceptible, fusible, organic solvent-soluble water-insoluble, low-stage phenol aldehyde resins having an average molecular weight corresponding to at least 3 and not over 6 phenolic nuclei per resin molecule and obtained without the use of a bisphenol have been described in a large number of patents including among others, U. S. 2,499,367, dated March 7, 1950, to De Groote and Keiser. Similarly oxalkylation-susceptible, fusible, organic solvent-soluble, water-insoluble phenol aldehyde resin derived by reaction between an aldehyde having but one functional group reactive with bisphenol and a difunctional bisphenol reactive towards aldehydes has been described in the U. S. Patent No. 2,564,191, dated July 14, 1951.

As far as I am aware there is no suitable description of a phenol aldehyde resin derived from two classes of phenols, one being a phenol of the formula

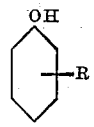

in which R is an aliphatic hydrocarbon radical having at least 4 and not more than 24 carbon atoms and substituted in the 2,4,6 position; the other being a tetrafunctional bisphenol; the ratio of the two classes of phenols employed being so as to contribute one bisphenol residue per resin molecule and particularly as employed in the present invention as a reactant. The nature of the condensate as obtained by the present manufacturing process is best understood by referring to comparable products derived from a difunctional resin rather than a tetrafunctional resin. In this instance functionality refers to reactivity toward formaldehyde or its equivalent.

For purpose of illustration it may be simpler to divert momentarily to the products described in the five aforementioned co-pending applications, Serial Nos. 288,742 through and including 288,746, inclusive and for sake of simplicity to the first one, i. e., Serial No. 288,742, in which the amine reactant is a nonhydroxylated monoamine. For purpose of simplicity the invention described in said co-pending application, Serial No. 288,742 may be exemplified by an idealized formula, as follows:

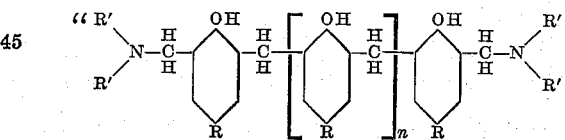

in which R represents a hydrocarbon substituent generally having 4 and not over 18 carbon atoms but most preferably not over 14 carbon atoms and n generally is a small whole number varying from 1 to 4. In the resin structure it is shown as being derived from formaldehyde although obviously other aldehydes are equally satisfactory. The amine residue in the above structure is derived from a basic amine, and usually a strongly basic amine, and may be indicated thus:

in which R' represents any appropriate hydrocarbon radical, such as an alkyl, alicyclic, arylalkyl radical, etc., free from hydroxyl radicals. The only limitation is that the radical should not be a negative radical, which considerably reduces the basicity of the amine, such as an aryl radical or an acyl radical. Needless to say, the two occurrences of R' may jointly represent a single divalent radical instead of two monovalent radicals. This is illustrated by morpholine and piperidine. The introduction of two such amino radicals into a comparatively small resin molecule, for instance, one having 3 to 6 phenolic nuclei as specified, alters the resultant product in a number of ways. In the first place, a basic nitrogen atom, of course, adds a hydrophile effect; in the second place, depending on the size of the radical R', there may be a counterbalancing hydrophobe effect or one in which the hydrophobe effect more than counterbalances the hydrophile effect of the nitrogen atom. Finally, in such cases where R' contains one or more oxygen atoms, another effect is introduced, particularly another hydrophile effect."

Such condensates, i. e., the condensates of Serial No. 288,742, are obtained from conventional phenol-aldehyde resins. It is well known that one can readily purchase on the open market, or prepare fusible, organic solvent-soluble, water-insoluble resin polymers of a composition approximated in an idealized form by the formula

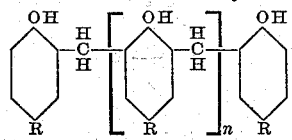

In the above formula $n$ represents a small whole number varying from 1 to 6, 7 or 8, or more, up to probably 10 to 12 units, particularly when the resin is subjected to heating under a vacuum as described in the literature. A limited sub-genus is in the instance of low molecular weight polymers where the total number of phenol nuclei varies from 3 to 6, i. e., $n$ varies from 1 to 4; R represents a hydrocarbon substituent, generally an alkyl radical having from 4 to 14 carbon atoms, such as a butyl, amyl, hexyl, decyl or dodecyl radical. Where the divalent bridge radical is shown as being derived from formaldehyde it may, of course, be derived from any other reactive aldehyde having 8 carbon atoms or less.

Reference is now being made to the accompanying drawing in which Figure 1 depicts a conventional resin of the kind referred to in my co-pending applications Serial Nos. 288,742, through 288,746, dated May 19, 1952. In the drawing R simply denotes an alkyl radical having 4 to 24 carbon atoms and the arrows indicate two points of reactivity towards formaldehyde. Needless to say, such resins can be obtained from any difunctional phenol and not necessarily a parasubstituted phenol.

The other figures in the drawing, to wit, 2, 3 and 4, depict in a similar manner resins of the kind herein employed in which one tetrafunctional bisphenol has entered into the resin structure and again the letter R has its prior significance and again the arrows indicate four points of reactivity. Obviously orthosubstituted phenols could be employed as well as parasubstituted phenols.

It is obvious that with difunctional resins the most one could combine is one or two moles of a suitable amine whereas in the use of resins herein described one could substitute not only one or two but as many as three or four and thus obtain products of an entirely different character and particularly have an increased hydrophile property in many instances.

Reverting again to what is said in the five copending applications previously referred to, and particularly to Serial No. 288,742, reference is made to the text which describes other products of reaction which appear in the cogeneric mixture resulting from reaction between the resin, the secondary amine and formaldehyde. The reference is as follows:

"In conducting reactions of this kind one does not necessarily obtain a hundred percent yield for obvious reasons. Certain side reactions may take place. For instance, 2 moles of amine may combine with one mole of the aldehyde or only one mole of the amine may combine with the resin molecule, or even to a very slight extent, if at all, 2 resin units may combine without any amine in the reaction product, as indicated in the following formulas:

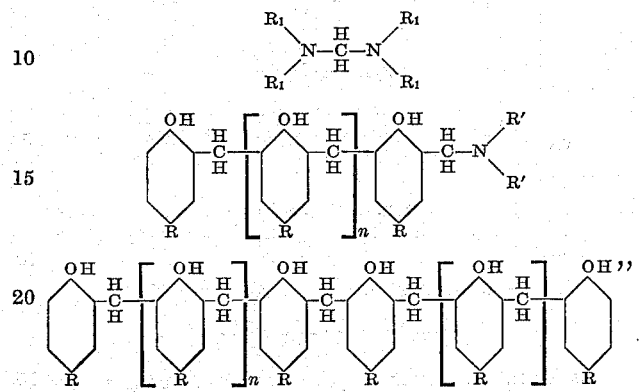

When a difunctional resin is replaced by a tetrafunctional resin in light of what has been said it becomes apparent, and particularly so when the amount of formaldehyde and the amount of amine is increased to 3 or 4 moles per mol of resin, that a much more complicated and much different structure results. Furthermore, to the extent that a molecular weight determination or an approximation thereof can be made the indications point to distinctly higher molecular weights than in the case of difunctional resins. In any event, the condensates so obtained are different in character and for some purposes particularly after oxyalkylation with ethylene oxide, propylene oxide, butylene oxide, glycide, or methylglycide are especially effective for the resolution of petroleum emulsions. Indeed, in many instances the oxyalkylation derivatives are distinctly more effective than the comparable products derived from condensates in which difunctional resins are used.

For purpose of convenience what is said hereinafter will be divided into four parts:

Part 1 is concerned with phenol-aldehyde resins suitable for condensation;

Part 2 is concerned with suitable secondary amines which can be employed in conjunction with the resins in the condensation procedure;

Part 3 is concerned with the condensation procedure as such;

Part 4 is concerned with the uses of the condensates for the resolution of petroleum emulsions.

PART 1

This is concerned with the preparation of phenol-aldehyde resins of the kind previously referred to, i. e., oxyalkylation-susceptible, fusible, organic solvent-soluble, water-insoluble, low-stage phenol-aldehyde resins having an average molecular weight corresponding to at least 3 and not over 6 phenolic nuclei per resin molecule; said resin being derived by reaction between an aldehyde having not over 8 carbon atoms and reactive towards two classes of phenols, one being (A) a phenol of the formula

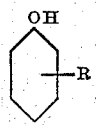

in which R is an aliphatic hydrocarbon radical having at least 4 and not more than 24 carbon atoms and substituted in the 2,4,6 position; the other being (B) a tetrafunctional bisphenol; the ratio of the two classes of phenols employed being so as to contribute one bisphenol residue per resin molecule.

The method employed for preparation of such resin is identical with that described in regard to the preparation of resins obtained solely from difunctional phenols as referred to in U. S. Patent No. 2,499,367 or resins obtained from difunctional bisphenols as described in U. S. Patent No. 2,564,191.

In either event one can prepare the resin with or without the use of a catalyst. The catalyst may be acid or basic. An acid catalyst such as sulfonic acid is preferred. In the present instance the difunctional phenol as differentiated from the bisphenol may have as many as 24 carbon atoms substituted in either the ortho or para position. For practical purposes those having 4 to 14 carbon atoms in the side chain are most suitable. There may or may not be a meta-substituent present. The ordinary phenols used are butylphenol, amylphenol, hexylphenol, octylphenol, nonylphenol, decylphenol, dodecylphenol, and tetradecylphenol. Generally, these are para substituted phenols and have no substituent in the meta position. Substituents may vary in structure as for example, the butyl group may be secondary or tertiary and the amyl group may also be secondary or tertiary. Such resins can be prepared with or without the use of a solvent, but for most purposes it is preferable to have a solvent present. The aldehyde used may be any aldehyde having not over 8 carbon atoms and particularly formaldehyde, acetaldehyde, propionaldehyde or butyraldehyde.

Resins of the kind herein described, i. e., tetrafunctional resins having 3 to 6 phenolic nuclei, one of which is a bisphenol nucleus per resin molecule have not been suitably described but the method of manufacture used in connection with the preparation of other comparable resins is entirely suitable.

For instance see U. S. Patent No. 2,499,368, dated March 7, 1950, to De Groote and Keiser. Resins can be made using an acid catalyst or basic catalyst or a catalyst showing neither acid nor basic properties in the ordinary sense, or without any catalyst at all. It is preferable that the resins employed be substantially neutral. In other words, if prepared by using a strong acid as a catalyst, such strong acid should be neutralized. Similarly, if a strong base is used as a catalyst it is preferable that the base be neutralized although I have found that sometimes the reactions described involving amines proceeded more rapidly in the presence of a small amount of free base. The amount may be as small as a 200th of a percent and as much as a few tenths of a percent. Sometimes moderate increase in caustic soda and caustic potash may be used. However, the most desirable procedure in practically every case is to have the resin neutral, except for the basicity of the amino groups, of the added reactant in the second step.

In preparing resins one does not get a single polymer, i. e., one having just 3 units, or just 4 units, or just 5 units, or just 6 units, etc. It is usually a mixture; for instance one approximating 4 phenolic nuclei will have some trimer and pentamer present. Thus, the molecular weight may be such that it corresponds to a fractional value for $n$ as, for example, 3.5, 4.5, or 5.2.

In the present instance one follows such well-known procedure but makes a mixture of part of the bisphenol with 2, 3, 4, or 5 parts of a difunctional phenol. The difunctional phenol employed may need not be necessarily the same and for that matter one could employ both ortho-substituted and para-substituted phenols. Resinification is carried along until the usual methods of molecular weight determination indicates a molecular weight corresponding to a combination of the tetrafunctional bisphenol with an equivalent amount of difunctional phenols, for instance a molecular weight corresponding to one mole of a tetrafunctional phenol and 2 moles of a difunctional phenol or a 1 and 3 combination or a 1 and 5 combination.

Bisphenols are well known and the most common example, and in fact the only one produced on a large commercial scale, is bisphenol A which is dihydroxydiphenyldimethylmethane. The word "bisphenol" is used in the same sense as it is used in U. S. Patent No. 2,506,486, dated May 2, 1950, to Bender, et al. As stated in that patent:

"By terms 'diphenol,' 'diphenylol,' 'bisphenol,' and 'dihydroxydiphenyl' as used herein is meant the dihydroxydiphenylmethanes, including the isomers, homologs and substituted dihydroxydiphenylmethane compounds all as set forth above. Unless the positions of the phenolic hydroxyl groups are otherwise specifically indicated, it is to be understood that they are in the 4,4'(para,para') positions on the phenyl rings."

In the instant case, however, bisphenols are limited to tetrafunctional bisphenols and for practical purposes this means bisphenols in most instances in which all four ortho groups are not substituted. Examples of such bisphenols are the following:

$$CH_2(C_6H_4OH)_2$$
$$CH_3CH(C_6H_4OH)_2$$
$$(CH_3)_2C(C_6H_4OH)_2$$
$$C_2H_5C(CH_3)(C_6H_4OH)_2$$
$$(C_2H_5)_2C(C_6H_4OH)_2$$
$$CH_3C(C_3H_7)(C_6H_4OH)_2$$
$$CH_3C(C_6H_5)(C_6H_4OH)_2$$
$$C_2H_5C(C_6H_5)(C_6H_4OH)_2$$
$$C_3H_7C(C_6H_5)(C_6H_4OH)_2$$
$$C_4H_9C(C_6H_5)(C_6H_4OH)_2$$
$$(CH_3C_6H_4)CH(C_6H_4OH)_2$$
$$(CH_3C_6H_4)C(CH_3)(C_6H_4OH)_2$$

Comparable bisphenols can be obtained using meta cresol as the initial reactant instead of phenol. A variety of other comparable diphenols are well-known as for example a diphenol of the following formula

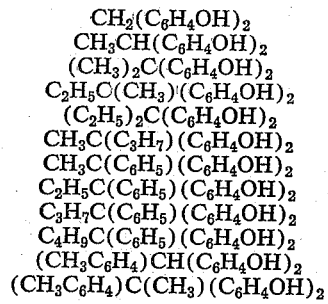

where R is a small alkyl group having not over 8 carbon atoms. For practical purposes, however, the most satisfactory bisphenol is bisphenol A. Equally satisfactory is bisphenol B which has the following formula

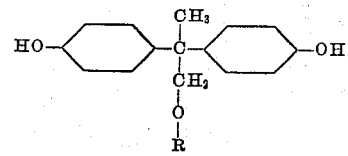

Some other comparable bisphenols are available.

At least one and in some instances two meta-substituted methyl radicals appear. As to other bisphenols some of which are suitable for the instant purpose, i. e., are tetrafunctional see U. S. Patents Nos. 2,482,728, 2,575,558, 2,626,939, 2,530,353.

As to the preparation of resins one can use the procedure as outlined in Example 1a in aforementioned U. S. Patent No. 2,499,370. One can use any of the difunctional phenols described in said patent and furthermore one can use any of the aldehydes employed and also any of the catalyst and any of the solvents. For purpose of convenience, what is said hereinafter will be limited largely to the use of formaldehyde particularly the 37% formaldehyde solution and the use of an acid catalyst along with xylene or similar solvent. Using the same procedure as described in connection with Example 1a in aforementioned U. S. Patent No. 2,499,370 and using approximately 0.6% of monoalkyl ($C_{10}$–$C_{20}$, principally $C_{12}$–$C_{14}$) benzene monosulfonic acid sodium salt in combination with 1% of HCl as a catalyst, a number of suitable resins have been prepared. Similarly the same procedure but employing 1% of diamylnaphthalene sulfonic acid as a catalyst based on the weight of the reaction mass a number of resins were prepared as described in Table I and Table II immediately following:

reaction with an acetone to give a cogeneric mixture of bisphenols which appear to be perfectly satisfactory when

TABLE I

| Ex. No. | Bisphenol | Amount, grams | Difunctional phenol | Amount, grams | Diamylnaphthalene sulfonic acid (grams) | Aldehyde | Amount, grams | Solvent | Amount, grams |
|---|---|---|---|---|---|---|---|---|---|
| 1a | A | 114 | p-Tert-amyl | 328 | 6.3 | Form. 37% sol | 203 | High boil. arom. pet. sol | 461 |
| 2a | A | 114 | ...do... | 328 | 6.2 | ...do... | 178 | ...do... | 474 |
| 3a | A | 228 | ...do... | 328 | 8.2 | ...do... | 267 | ...do... | 604 |
| 4a | A | 137 | ...do... | 197 | 4.8 | ...do... | 146 | ...do... | 356 |
| 5a | A | 114 | ...do... | 246 | 5.2 | ...do... | 162 | ...do... | 389 |
| 6a | A | 76 | ...do... | 273 | 5.1 | ...do... | 162 | ...do... | 378 |
| 7a | A | 76 | ...do... | 328 | 6 | ...do... | 189 | ...do... | 443 |
| 8a | A | 228 | ...do... | 164 | 5.3 | ...do... | 146 | ...do... | 414 |
| 9a | A | 57 | ...do... | 164 | 3.0 | Acetal | 55 | Xylene | 256 |
| 10a | A | 57 | ...do... | 164 | 3.3 | Furfural | 108 | ...do... | 292 |
| 11a | A | 57 | ...do... | 164 | 3.4 | Benzald | 119 | ...do... | 303 |
| 12a | A | 57 | ...do... | 164 | 6.2 | Butyl | 90 | ...do... | 288.5 |
| 13a | A | 57 | ...do... | 164 | 7.2 | Heptal | 143 | ...do... | 333 |
| 14a | A | 57 | ...do... | 164 | 7.4 | Salicylic | 153 | ...do... | 357 |
| 15a | A | 228 | ...do... | 164 | 3.3 | Furfural | 113 | ...do... | 315 |
| 16a | A | 57 | ...do... | 164 | 3.5 | Benzald | 133 | ...do... | 365 |
| 17a | A | 76 | Para-cresyl | 144 | 3.6 | Form. 37% | 135 | High boil. arom. pet. sol | 243 |
| 18a | A | 76 | p-Tert-butyl | 200 | 4.1 | ...do... | 135 | ...do... | 300 |
| 19a | A | 76 | Octyl-phenol | 275 | 4.9 | ...do... | 135 | ...do... | 376 |
| 20a | B | 81 | Nonyl-phenol | 295 | 5.0 | ...do... | 135 | ...do... | 396 |
| 21a | C | 85 | o-Tert-amyl | 219 | 6.2 | ...do... | 135 | ...do... | 315 |
| 22a | D | 67 | p-Tert-amyl | 219 | 4.1 | ...do... | 135 | ...do... | 299 |

Bisphenol A is p,p-dihydroxy diphenyl dimethyl methane.
Bisphenol B is the comparable derived from ethyl methyl ketone instead of dimethyl ketone.
Bisphenol C is comparable to bisphenol A but derived from meta-cresol instead of phenol.
Bisphenol D is o,o-dihydroxy diphenyl methane.

TABLE II

| Ex. No. | Molal ratio of bisphenol to difunct. phenol to aldeh. | Mol ratio of water out based on aldehyde [1] | Max. temp. during resinification, °C. | Color | Hardness (solv. free basis) | Theo. molec. weight [2] | Remarks (see note D) |
|---|---|---|---|---|---|---|---|
| 1a | 1:4:5 | 1.02 | 150 | Amber blackish | Hard | 954 | The 50% solution is a soft solid. |
| 2a | 1:4:4.4 | 0.959 | 150 | ...do... | ...do... | 954 | (See note A.) |
| 3a | 1:2:3.3 | 0.994 | 134 | Black (red.) | ...do... | 590 | (See note B.) |
| 4a | 1:2:3 | 0.906 | 155 | Amber (black) | | | 2.7 moles H₂O liber. per mole bisphenol. |
| 5a | 1:3:4 | 0.974 | 150 | Black-purple | Hard | 768 | Viscosity at 95° C.=226 cps.[3] |
| 6a | 1:5:6 | 1.0 | 155 | Black-red | | 1,120 | Viscosity=160 cps. at 80° C.[3] |
| 7a | 1:6:7 | 0.96 | 150 | Black-brown | Hard | 1,296 | |
| 8a | 1:1:1.8 | 0.98 | 154 | Dark purple | Very hard | | |
| 9a | 1:4:5 | 0.756 | 146 | Dark brown | Hard | 1,014 | (See note C.) |
| 10a | 1:4:4.5 | 0.825 | 145 | ...do... | ...do... | 1,235 | H₂O/bisphenol=3.65 moles, reaction time 17.5 hrs. |
| 11a | 1:4:4.5 | 0.975 | 145 | Dark amber | ...do... | 1,279 | H₂O/bisphenol=4.4. |
| 12a | 1:4:5 | 0.71 | 149 | Brown (dark) | Sligh. soft | 1,154 | H₂O/bisphenol=3.55, reaction time 17.5 hrs. |
| 13a | 1:4:5 | 0.957 | 148 | Dark brown | Hard | 1,366 | H₂O/bisphenol=4.77. |
| 14a | 1:4:5 | 0.845 | 150 | ...do... | ...do... | 1,406 | H₂O/bisphenol=4.22, reaction time 17.5 hrs. |
| 15a | 1:4:5 | 0.977 | 147 | ...do... | ...do... | 1,246 | H₂O/bisphenol=0.984. |
| 16a | 1:4:5 | 0.956 | 145 | Dark amber | ...do... | 1,326 | H₂O/bisphenol=4.77. |
| 17a | 1:4:5 | 0.833 | 158 | Dark brown | ...do... | 720 | H₂O/bisphenol=4.17. |
| 18a | 1:4:5 | 0.833 | 156 | ...do... | ...do... | 888 | Do. |
| 19a | 1:4:5 | 0.85 | 153 | ...do... | ...do... | 1,013 | H₂O/bisphenol=4.18. |
| 20a | 1:4:5 | 0.8 | 155 | Dark amber | ...do... | 1,187 | H₂O/bisphenol=4. |
| 21a | 1:4:5 | 0.8 | 159 | Dark brown | ...do... | 1,003 | Do. |
| 22a | 1:4:5 | 0.867 | 152 | ...do... | ...do... | 904 | Very hard resin. |

Note A—50% solution is very viscous, but not as much as when HCHO is 5 moles. The viscosity of 50% solution at 100° C.=22 cps. was used.
Note B—Crosslinkage occurred during dehydration HCHO to phenol ratio (1:1.1) is probably too high.
Note C—H₂O/bisphenol=3.78 moles. Reaction is very slow. Reaction=25 hours. Thinner solu. than HCHO resin.
Note D—Reaction time in all examples 2 to 3 hours except where otherwise indicated.
[1] It is quite possible that in a molal ratio of 1, 4 and 5 that not more than 4 mols of the aldehyde enters into reaction particularly when an acid catalyst is used. For this reason the value of .8 for example in column 3 corresponding to Examples 20a and 21a may still well be theoretical 100% combination.
[2] Theoretical molecular weight based on the single structural unit.
[3] Viscosity taken as 50% solution in high boiling solvent.

The resins illustrated by Examples 1a through 22a have been prepared using bisphenol B instead of bisphenol A. The products obtained were substantially identical except that they seem to show a little higher oil solubility and less tendency, if any, towards gel formation. The same is true where bisphenol C has been employed. A mixture of materials consisting of 3,5 xylenol, m-ethyl phenol, m-cresol was subjected to substituted for bisphenol A in the above examples.

PART 2

As noted previously, a variety of secondary amines free from a primary amino group may be employed. These amines fall into five categories, as indicated previously.

One category consists of strongly basic secondary monoamines free from hydroxyl groups whose composition may be indicated thus:

in which R' represents a monovalent alkyl, alicyclic, arylalkyl radical and may be heterocyclic in a few instances as in the case of piperidine and a secondary amine derived from furfurylamine by methylation or ethylation, or a similar procedure.

Another example of a heterocyclic amine is, of course, morpholine.

The secondary amines most readily available are, of course, amines such as dimethylamine, methylethylamine, diethylamine, dipropylamine, ethylpropylamine, dibutylamine, diamylamine, dihexylamine, dioctylamine, and dinonylamine. Other amines include bis(1,3-dimethylbutyl) amine. There are, of course, a variety of primary amines which can be reacted with an alkylating agent such as dimethyl sulfate, diethyl sulfate, an alkyl bromide, an ester of sulfonic acid, etc., to produce suitable amines within the herein specified limitations. For example, one can methylate alphamethylbenzylamine, or benzylamine itself, to produce a suitable reactant. Needless to say, one can use secondary amines such as dicyclohexylamine, dibutylamine or amines containing one cyclohexyl group and one alkyl group, or one benzyl group and one alkyl group, such as ethylcyclohexylamine, ethylbenzylamine, etc.

Other suitable compounds are exemplified by $(C_2H_5OC_2H_4OC_2H_4)_2NH$
$(C_8H_{17}OC_2H_4OC_2H_4OC_2H_4)_2NH$
$(C_4H_9OCH_2CH(CH_3)O(CH_3)CHCH_2)_2NH$
$(CH_3OCH_2CH_2OCH_2CH_2OCH_2CH_2)_2NH$
$(CH_3OCH_2CH_2CH_2CH_2CH_2CH_2)_2NH$ Other somewhat similar secondary amines are those of the composition

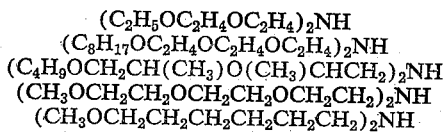

as described in U. S. Patent No. 2,375,659, dated May 8, 1945, to Jones et al. In the above formula R may be methyl, ethyl, propyl, amyl, octyl, etc.

Other amines can be obtained from products which are sold in the open market, such as may be obtained by alkylation of cyclohexylmethylamine or the alkylation of similar primary amines, or for that matter, amines of the kind described in U. S. Patent No. 2,482,546, dated September 20, 1949, to Kaszuba, provided there is no negative group or halogen attached to the phenolic nucleus. Examples includes the following: beta-phenoxyethylamine, gamma-phenoxypropylamine, beta-phenoxy-alpha-methylethylamine, and beta-phenoxypropylamine.

Other suitable amines are the kind described in British Patent No. 456,517 and may be illustrated by

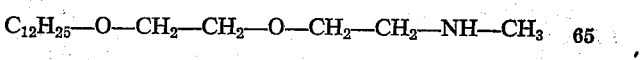

The secondary category represents secondary amines which are hydroxylated monoamines. These may be illustrated by diethanolamine, methylethanolamine, dipropanolamine, dibutanolamine and ethylpropanolamine. Suitable primary amines which can be so converted into secondary amines include butylamine, amylamine, hexylamine, higher molecular weight amines derived from fatty acids, cyclohexylamine, benzylamine, furfurylamine, etc.

Other suitable amines include 2-amino-1-butanol, 2-amino-2-methyl-1-propanol, 2-amino-2-methyl-1,3-propanediol, 2-amino-2-ethyl-1,3-propanediol, and tris-(hydroxymethyl)-aminoethane. Another example of such amines is illustrated by 4-amino-4-methyl-2-pentanol.

Other suitable compounds are the following:

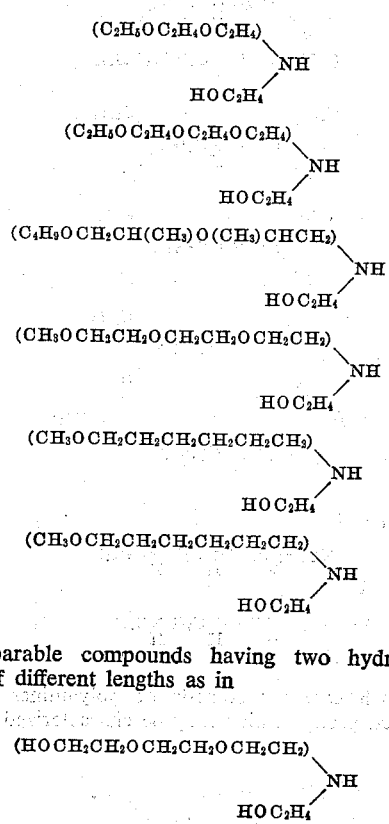

or comparable compounds having two hydroxylated groups of different lengths as in

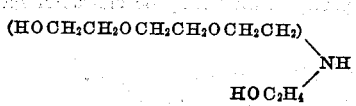

Other examples of suitable amines include alpha-methylbenzylamine and monoethanolamine; also amines obtained by treating cyclohexylmethylamine with one mole of an oxyalkylating agent as previously described; beta-ethylhexylbutanolamine, diglycerylamine, etc. Another type of amine which is of particular interest because it includes a very definite hydrophile group includes sugar amines such as glucamine, galactamine and fructamine, such as N-hydroxyethylfructamine.

Other suitable amines may be illustrated by

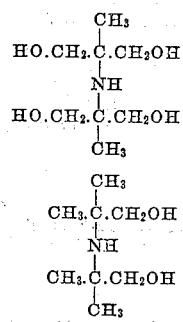

See also, corresponding hydroxylated amines which can be obtained from rosin or similar raw materials and described in U. S. Patent No. 2,510,063, dated June, 1950, to Bried. Still other examples are illustrated by treatment of certain secondary amines, such as the following, with a mole of an oxyalkylating agent as described; phenoxyethylamine, phenoxyalphamethylethylamine, and phenoxypropylamine.

Polyamines free from a hydroxyl group may be illustrated by the following:

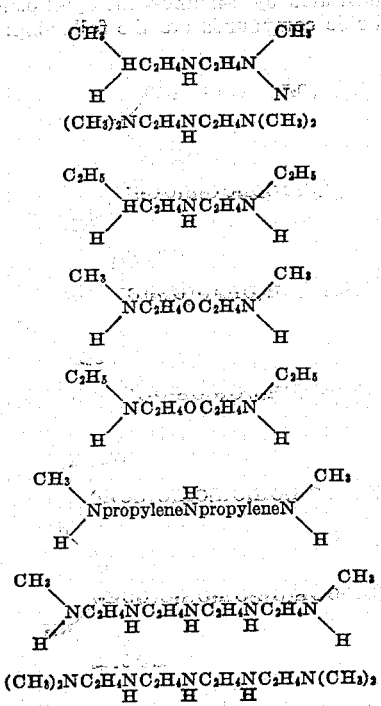

The fourth category consists of polyamines having hydroxylated groups which may be characterized by the following:

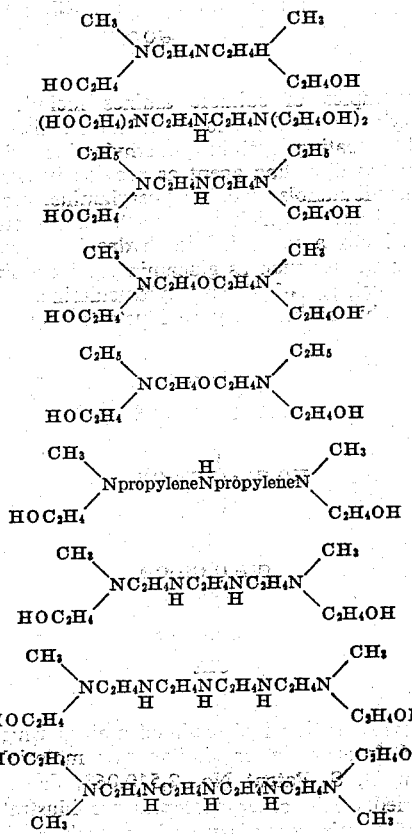

Suitable cyclic amidines which may or may not have a hydroxyl group but are free from primary amino groups may be illustrated by the following:

2-undecylimidazoline
2-heptadecylimidazoline
2-oleylimidazoline
1-N-decylaminoethyl,2-ethylimidazoline
2 - methyl, 1 - hexadecylaminoethylaminoethylimidazoline
1-dodecylaminopropylimidazoline
1-(stearoyloxyethyl)aminoethylimidazoline
1-stearamidoethylaminoethylimidazoline
1-(N-dodecyl)-acetamidoethylaminoethylimidazoline
2-heptadecyl, 4,5-dimethylimidazoline
1-dodecylaminohexylimidazoline
1-stearoyloxethylaminohexylimidazoline
2-heptadecyl, 1 - methylaminoethyl tetrahydropyrimidine
4 - methyl, 2-dodecyl, 1 - methylaminoethylaminoethyl tetrahydropyrimidine As to hydroxylated reactants all that is required is to employ a suitable compound having a 5-membered ring or after being subjected to oxyalkylation with ethylene oxide or the like. Thus, a compound having no basic secondary amino radical but a basic primary amino radical can be reacted with a mole of an alkylene oxide, such as ethylene oxide, propylene oxide, glycide, etc., to yield a perfectly satisfactory reactant for the herein described condensation procedure. This can be illustrated in the following manner by a compound such as

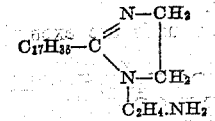

2-heptadecyl,1-aminoethylimidazoline which can be reacted with a single mole of ethylene oxide, for example to produce the hydroxy ethyl derivative of 2-heptadecyl, 1-aminoethylimidazoline, which can be illustrated by the following formula:

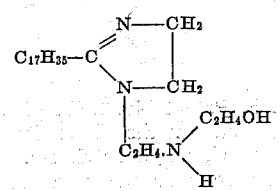

Other reactants may be employed in connection with an initial reactant of the kind described above to wit, 2-heptadecyl, 1 - aminoethylimidazoline; for instance, reaction with an alkylene imine such as ethylene imine, propylene imine, etc. If reacted with ethylene imine the net result is to convert a primary amino radical into a secondary amino radical and also introduces a new primary amine group. If ethylene imine is employed, the net result is simply to convert 2-heptadecyl, 1-aminoethylimidazoline into 2 - heptadecyl, 1 - diethylenediamineimidazoline. However, if propylene imine is used the net result is a compound which can be considered as being derived hypothetically from a mixed polyalkylene amine, i. e., one having both ethylene groups and a propylene group between nitrogen atoms.

PART 3

The products obtained by the herein described processes represent cogeneric mixtures which are the result of a condensation reaction or reactions. Since the resin molecule cannot be defined satisfactorily by formula, although it may be so illustrated in an idealized simplification, it is difficult to actually depict the final product of the cogeneric mixture except in terms of the process itself.

The herein described amine-modified resins are obtained from formaldehyde or in some instances glyoxal and resins of the kind described in Part 1 preceding, in combination with secondary amines. Generally speaking in the preparation of conventional amine-modified resins the object is to obtain a heat-convertible compound or resin or at least heat convertible in presence of added formaldehyde. See, for example, U. S. Patent No. 2,031,-557 to Bruson. Since the condensation products obtained in the present invention are not heat-convertible and since temperature up to 150° C. or thereabouts may be employed, it is obvious that the procedure becomes comparatively simple. Indeed, perhaps, no description is necessary over and above what has been previously, in light of subsequent examples. However, for purpose of clarity the following details are included.

A convenient piece of equipment for preparation of these cogeneric mixtures is a resin pot of the kind described in aforementioned U. S. Patent No. 2,499,368. In most instances the resin selected is not apt to be a fusible liquid, but is apt to be a solid even at higher temperatures, than at usual or ordinary room temperature. Thus, I have found it convenient to use a solvent and particularly one which can be removed readily at a comparatively moderate temperature, for instance at 150° C. or thereabouts. A suitable solvent is usually benzene, xylene or a comparable petroleum hydrocarbon or a mixture of such or similar solvents. The reaction can be conducted in such a way that the initial reaction, and perhaps the bulk of the reaction, takes place in a polyphase system. However, if desirable, one can use an oxygenated solvent such as a low-boiling alcohol, including ethyl alcohol, methyl alcohol, etc. Higher alcohols can be used or one can use a comparatively non-volatile solvent such as dioxane or the diethylether of ethyleneglycol. One can also use a mixture of benzene or xylene and such oxygenated solvents. Note that the use of such oxygenated solvent is not required in the sense that it is not necessary to use an initial resin which is soluble only in an oxygenated solvent of the kind noted, and it is not necessary to have a single phase system for reaction.

Needless to say, the resins used are tetrafunctional. They could be combined with one mole of an appropriate amine or with 2 moles or with 3 moles or with 4 moles. If combined with one mole, or with 2 moles of an appropriate amine there is no advantage in using the previously described resins over the conventional resins derived from difunctional phenols only. The real advantage is the ability to combine at least 3 and more particularly 4 moles of amine with one mole of a resin having a total of 3 to 6 phenolic nuclei. For this reason the hereto appended claims specifically limit my invention to such combinations where at least 3 moles of appropriate amine is combined with 1 phenolic resin.

In the preparation of resin condensates the aldehydes used are formaldehyde and glyoxal. The use of glyoxal is limited to such compounds wherein insolubility does not occur. Needless to say, when glyoxal is used to obtain substantially the same effect, the molar ratio is cut in two. In the claims reference is made to formaldehyde as such, but obviously where glyoxal can be substituted such products would be within the boundaries of the invention.

Although the condensation reaction can be conducted without the use of a solvent, in fact, it can be conducted using formaldehyde in high concentrations or even the anhydrous equivalent, it is preferred to use the 37% solution and also to use a solvent.

I have found no difficulty in promoting the condensation reaction although at times it is desirable to add some solvent having a common solvent effect. Thus an oxygenated solvent may or may not be employed. Such solvent may be employed in combination with a hydrocarbon solvent such as xylene. However, if the reaction mass is going to be subjected to some further reaction where the solvent may be objectionable as in the case of ethyl or hexyl alcohol, and if there is to be subsequent oxyalkylation, then, obviously, the alcohols should not be used or else it should be removed. The fact that an oxygenated solvent need not be employed, of course, is an advantage for reasons stated.

Another factor, as far as the selection of solvent goes, is whether or not the cogeneric mixture obtained at the end of the reaction is to be used as such or in the salt form. The cogeneric mixtures obtained are apt to be solids or thick viscous liquids in which there is some change from the initial resin itself, particularly if some of the initial solvent is apt to remain without complete removal. Even if one starts with a resin which is almost water-white in color, the condensation products obtained are invariably dark and particularly reddish or dark red in color.

In some instances condensates have been prepared using a formaldehyde in one case and glyoxal in the other. Due to the difunctional property of glyoxal the condensate frequently is harder and at times may even be insoluble.

Indeed, depending on the resin selected and the amine selected the condensate product or reaction mass on a solvent-free basis is apt to be harder than the original resin itself. This is particularly true when all the amino hydrogen atoms present in the amine have entered into reaction, as in the case of a polyamine.

The products obtained, depending on the reactants selected, may be water-insoluble, or water-dispersible, or water-soluble, or close to being water-soluble. Water solubility is enhanced, of course, by making a solution in the acidified vehicle such as a dilute solution, for instance, a 5% solution of hydrochloric acid, acetic acid, hydroxyacetic acid, etc. One also may convert the finished product into salts by simply adding a stoichiometric amount of any selected acid and removing any water present by refluxing with benzene or the like. In fact, the selection of the solvent employed may depend in part whether or not the product at the completion of the reaction is to be converted into a salt form.

It so happens as will be pointed out that frequently it is convenient to eliminate all solvent using a temperature of not over 150° C. and employing vacuum if required. This applies, of course, only to those circumstances where it is desirable or necessary to remove the solvent. Petroleum solvents, aromatic solvents, etc., can be used. The selection of solvent, such as benzene, xylene, or the like, depends primarily on cost, i. e., the use of the most economical solvent and also on three other factors, two of which have been mentioned previously; (a) is the solvent to remain in the reaction mass without removal?; (b) is the reaction mass to be subjected to further reaction in which the solvent, for instance, an alcohol, either low boiling or high boiling, might interfere as in the case of oxyalkylation?; and the third factor is this; (c) is an effort to be made to purify the reaction mass by the usual procedure as, for example, a water-wash to remove any unreacted low molal soluble amine if employed and present after reaction? Such procedures are well known, and needless to say, certain solvents are more suitable than others. Everything else being equal, I have found xylene the most satisfactory solvent.

I have found no advantage in using a low temperature, approximately room temperature, at the start of the reaction although this is sometimes done purely as a matter of convenience. Indeed, using formaldehyde I have usually done nothing more than prepare the reaction mixture, add a suitable amount of xylene, and reflux for approximately 1½ to 6½ hours at temperatures varying, as the case may be, from 135° to 160° C. Where the amine has a comparatively low basicity I have sometimes added a small amount or approximately 1% of sodium methylate.

However, using a xylene-benzene mixture, for instance, approximately 17 parts of benzene and 35 parts of xylene, and a phase-separating trap to eliminate water I have found that I could employ temperatures between 90° and 100° C., and eliminate the water of condensation by refluxing at this temperature. However, I have found no particular advantage in using this intermediate temperature over and above the high temperature previously noted.

The only bisphenol commercially available at quantity prices is bisphenol A. The four most readily available difunctional phenols having alkyl groups of at least four carbon atoms or more are: p-tertiary-amyl phenol, p-tertiary-butyl phenol, octyl phenol and nonyl phenol. The cheapest aldehyde and most suitable aldehyde is formaldehyde. For this reason the description of the condensation reaction has been limited to these products which best serve as raw material in actual commercial manufacture. Thus, the resins employed in the subsequent examples and tables are 1a, 18a, 19a and 20a. The latter was made from bisphenol B.

Generally speaking, the preference has been to prepare condensates which had substantial hydrophile properties. This usually means the use of hydroxylated amines or polyamines. Those commercially available and particularly suitable include: diethanolamine, diisopropanolamine, dibutanolamine and the polyamines which have been reacted with approximately 2 mols of an alkylene oxide such as ethylene oxide. Such compounds include among others symmetrical di(hydroxyethyl) ethylene diamine, symmetrical di(hydroxyethyl) diethylene triamine, symmetrical di(hydroxypropyl) ethylene diamine, symmetrical di(hydroxybutyl) ethylene diamine and the comparable products derived from 1,2-diaminopropane or 1,3-diaminopropane. From a practical standpoint most readily available amines include diethanolamine, diisopropanolamine, symmetrical di(hydroxyethyl) ethylene diamine, morpholine, etc. Using diamines, and especially a polyamine having a single reactive secondary amino group such as the hydroxyethyl derivative of dimethylamino propylamine obtained by the reaction of one mol of ethylene oxide and one mol of dimethylamino propylamine yields condensates, which are particularly suitable for the present purpose. Another particularly suitable amine is alpha-methylbenzyl monoethanolamine.

It is not necessary to point out that in the condensation reaction one may obtain condensates which in all likelihood are monomers particularly when derived from a monoamino reactant such as diethanolamine or diisopropanolamine. On the other hand when derived from diamines in which there are two secondary amino groups available for reaction obviously more complex forms and probably polymers may form. This may apply also where glyoxal is used.

The complexity of structure is increased if one employs a symmetrically substituted polyamine such as di(hydroxyethyl) diethylenetriamine or triethylenetetramine or symmetrical di(hydroxyethyl) 3,3-iminobispropylamine.

In making a large variety of condensates I employed conventional glass pots with appropriate heating jackets, condensers, and stirrers, etc. These glass pots had a capacity of approximately 5 liters. The procedure employed is illustrated by the example immediately following:

*Example 1b*

954 grams of resin identified as 1a was dissolved in approximately 422 grams of xylene. To this was added 420.6 grams of diethanolamine. After mixing at room temperature 324.5 grams of 37% formaldehyde was added slowly and the temperature raised over a period of time to approximately 150° C. and the mixture was allowed to reflux for about 2 to 3 hours. During this period of time water of solution or water of reaction was withdrawn so that the mixture continued to reflux to 148° for another hour. In some instances some xylene was withdrawn and some benzene added to hold the temperature in the approximate 145° to 150° range. Actually, the completion of condensation can be determined readily by continuing until no more water can be separated by means of a conventional phase separating trap. In the final product xlyene was returned to the mass if required or enough of the solvent was distilled out so that the solvent remaining behind was the same as originally added. This was purely for a matter of convenience in order that the mixture as completed contained the same amount of solvent as when it started. In each instance a small amount of sample was heated to eliminate the xylene or other solvent. The resultant product was usually hard or sometimes tacky rather than hard and the color varied from reddish black to almost black. In some instances the condensate was amber or dark brown rather than reddish. The product so obtained could be bleached with the filtering chars or filtering earths. For most purposes, and particularly when used subsequently as chemical reactant, there is no advantage in such bleaching. In such instances where there was a tendency to form insoluble or semi-rubbery masses, there is some advantage in using an oxygen-containing solvent such as the dimethyl ether of diethylene glycol. Such solvent was used to replace the third or fourth of the xylene or benzene.

Similar products were prepared as indicated in the following tables:

TABLE III

| Ex. No. | Resin | Molec. weight | Resin, grams | Amine | Grams | Aldehyde | Grams | Solvent | Grams |
|---|---|---|---|---|---|---|---|---|---|
| 1b | 1a | 954 | 954 | AA | 420.6 | Form. 37% | 324.5 | Xylene | 1,422 |
| 2b | 18a | 888 | 954 | AA | 420.6 | ---do--- | 324.5 | ---do--- | 1,356 |
| 3b | 19a | 1,013 | 954 | AA | 420.6 | ---do--- | 324.5 | ---do--- | 1,481 |
| 4b | 20a | 1,173 | 954 | AA | 420.6 | ---do--- | 324.5 | ---do--- | 1,641 |
| 5b | 1a | 954 | 954 | BB | 532 | ---do--- | 324.5 | ---do--- | 1,534 |
| 6b | 18a | 888 | 954 | BB | 532 | ---do--- | 324.5 | ---do--- | 1,468 |
| 7b | 19a | 1,013 | 954 | BB | 532 | ---do--- | 324.5 | ---do--- | 1,593 |
| 8b | 20a | 1,173 | 954 | BB | 532 | ---do--- | 324.5 | ---do--- | 1,753 |
| 9b | 1a | 954 | 954 | CC | 661 | ---do--- | 324.5 | ---do--- | 1,663 |
| 10b | 18a | 888 | 954 | CC | 661 | ---do--- | 324.5 | ---do--- | 1,597 |
| 11b | 19a | 1,013 | 954 | CC | 661 | ---do--- | 324.5 | ---do--- | 1,722 |
| 12b | 20a | 1,173 | 954 | CC | 661 | ---do--- | 324.5 | ---do--- | 1,882 |
| 13b | 1a | 954 | 954 | DD | 536.8 | ---do--- | 324.5 | ---do--- | 1,539 |
| 14b | 18a | 888 | 954 | DD | 536.8 | ---do--- | 324.5 | ---do--- | 1,473 |
| 15b | 19a | 1,013 | 954 | DD | 536.8 | ---do--- | 324.5 | ---do--- | 1,598 |
| 16b | 20a | 1,173 | 954 | DD | 536.8 | ---do--- | 324.5 | ---do--- | 1,758 |
| 17b | 1a | 954 | 954 | AA | 420.6 | Glyoxal | 378 | ---do--- | 1,423 |
| 18b | 18a | 888 | 954 | BB | 532 | Glyoxal 30% | 378 | ---do--- | 1,468 |

NOTE.—In the above table AA is used to designate diethanolamine; BB is used to designate diisopropanolamine; CC is used to designate alpha methylbenzylmonoethanolamine; DD is used to designate hydroxyethyl dimethylamino propylamine obtained by reaction between 1 mole of ethylene oxide and 1 mole of dimethylamino propylamine.

TABLE IV

| Ex. No. | Molal ratio of reactant resin: amine aldehyde | Water out, grams | Ratio water out to aldehy. present | Reaction data | | | | |
|---|---|---|---|---|---|---|---|---|
| | | | | Max. temp. | Time period | Color of product | Char. of solvent-free condensate | Theo. molec. weight per structural unit |
| 1b | 1:4:4 | 270.5 | 0.92 | 148 | 2½ | Dk. amber | Hard brittle | 1,422 |
| 2b | 1:4:4 | 272.4 | 0.95 | 146 | 2¼ | Dk. purple | do | 1,356 |
| 3b | 1:4:4 | 269.5 | 0.91 | 149 | 2½ | Dk. amber | do | 1,481 |
| 4b | 1:4:4 | 268 | 0.89 | 149 | 3 | Blk. amber | do | 1,641 |
| 5b | 1:4:4 | 273 | 0.96 | 144 | 2½ | Dk. amber | do | 1,534 |
| 6b | 1:4:4 | 271.7 | 0.94 | 146 | 2½ | do | do | 1,468 |
| 7b | 1:4:4 | 268.8 | 0.90 | 148 | 3 | do | do | 1,593 |
| 8b | 1:4:4 | 269.5 | 0.91 | 145 | 3 | Amber blk. | do | 1,753 |
| 9b | 1:4:4 | 267.3 | 0.88 | 147 | 2¾ | Dk. amber | do | 1,663 |
| 10b | 1:4:4 | 268.7 | 0.90 | 147 | 2½ | Amber | do | 1,597 |
| 11b | 1:4:4 | 271 | 0.93 | 145 | 3 | Dk. amber | do | 1,722 |
| 12b | 1:4:4 | 265.2 | 0.85 | 144 | 3¼ | Blk. brown | do | 1,882 |
| 13b | 1:4:4 | 266.6 | 0.87 | 147 | 2½ | Very dk. brown | do | 1,539 |
| 14b | 1:4:4 | 270.5 | 0.92 | 149 | 2¼ | Dk. amber | do | 1,473 |
| 15b | 1:4:4 | 267.3 | 0.88 | 143 | 2¾ | Blk. amber | do | 1,598 |
| 16b | 1:4:4 | 264.5 | 0.84 | 146 | 2¾ | Dk. amber | do | 1,758 |
| 17b | 1:4:2 | 322 | 0.68 | 144 | 1½ | Dk. brown | Hard | 1,423 |
| 18b | 1:4:2 | 325 | 0.75 | 142 | 1½ | do | do | 1,468 |

There is no need to conduct the resinification in one piece of equipment and the condensation in another piece of equipment. Condensation in this instance refers to the reaction involving the amine. Of course, resinification in the manufacturing of phenol-aldehyde resins is obviously a condensation reaction. Thus, one can use a large size glass pot about 5 liters capacity, add the bisphenol such as bisphenol A along with the selected catalyst such as diamyl naphthalene sulfonic acid together with the solvent. Formaldehyde can be added in appropriate fashion. When resinification is complete and water of solution or water of reaction has been withdrawn by means of a phase separating trap the reaction mass can be cooled, and the selected amine such as diisopropanolamine can be added after having previously added sufficient caustic soda to neutralize the sulfonic acid. Formaldehyde can then be added and the second one of the condensation reactions can be conducted in the same equipment and thus simplify manufacturing procedures. Actually, this is the procedure employed on a larger scale in actual manufacture.

It has been previously pointed out that the structure of the condensate may vary considerably and as may be monomeric and polymeric. Note also what has been said in the introductory part of the specification in regard to the combinations possible in complexity of the structure of various condensates.

PART 4

As to the use of conventional demulsifying agents reference is made to U. S. Patent No. 2,626,929, dated January 7, 1953, to De Groote, and particularly to Part 3. Everything that appears therein applies with equal force and effect to the instant process, noting only that where reference is made to Example 13b in said text beginning in column 15 and ending in column 18, reference should be to Example 1b, herein described.

Having thus described my invention, what I claim as new and desire to secure by Letters Patent is:

1. The process of breaking petroleum emulsions of the water-in-oil type characterized by subjecting the emulsion to a demulsifying agent including a synthetic hydrophile product obtained by the process of condensing (a) an oxyalkylation-susceptible, fusible, organic solvent-soluble, water-insoluble, low-stage phenol-aldehyde resin having an average molecular weight corresponding to at least 3 and not over 6 phenolic nuclei per resin molecule; said resin being derived by reaction between an aldehyde having not over 8 carbon atoms and reactive towards two classes of phenols; one being (A) a phenol of the formula

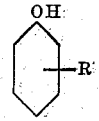

in which R is an aliphatic hydrocarbon radical having at least 4 and not more than 24 carbon atoms and substituted in the 2,4,6 position; the other being (B) a tetrafunctional bisphenol; the ratio of the two classes of phenols employed being so as to contribute one bisphenol residue per resin molecule; (b) a basic hydroxylated secondary amine free from any primary amino radical and having not more than 32 carbon atoms in any group attached to any amino nitrogen radical and reactive towards formaldehyde; (c) formaldehyde; said condensation reaction being conducted at a temperature sufficiently high to eliminate water and below the pyrolytic point of the reactants and resultants of reaction; with the proviso that the ratio of reactants be approximately within the range of 1,3, and 3 to 1,4 and 4 respectively; and with the added proviso that the resinous condensation product resulting from the process be heat-stable.

2. The process of breaking petroleum emulsions of the water-in-oil type characterized by subjecting the emulsion to a demulsifying agent including a synthetic hydrophile product obtained by the process of condensing (a) an oxyalkylation-susceptible, fusible, organic solvent-soluble, water-insoluble, low-stage phenol-aldehyde resin having an average molecular weight corresponding to at least 3 and not over 6 phenolic nuclei per resin molecule; said resin being derived by reaction between an aldehyde having not over 8 carbon atoms and reactive towards two classes of phenols, one being (A) a phenol of the formula

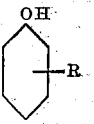

in which R is an aliphatic hydrocarbon radical having at least 4 and not more than 24 carbon atoms and substituted in the 2,4,6 position; the other being (B) a tetrafunctional bisphenol; the ratio of the two classes of phenols employed being so as to contribute one bisphenol residue per resin molecule; (b) a basic hydroxylated secondary monoamine having not more than 32 carbon atoms in any group attached to the amino nitrogen atom and reactive towards formaldehyde; (c) formaldehyde; said condensation reaction being conducted at a temperature sufficiently high to eliminate water and below the pyrolytic point of the reactants and resultants of reaction; with the proviso that the ratio of reactants be approximately within the range of 1,3 and 3 to 1,4 and 4 respectively; and with the final proviso that the resinous condensation product resulting from the process be heat-stable.

3. The process of breaking petroleum emulsions of the water-in-oil type characterized by subjecting the emulsion to a demulsifying agent including a synthetic hydrophile product obtained by the process of condensing (a) an oxyalkylation-susceptible, fusible, organic solvent-soluble, water-insoluble, low-stage phenol-aldehyde resin having an average molecular weight corresponding to at least 3 and not over 6 phenolic nuclei per resin molecule; said resin being derived by reaction between an aldehyde having not over 8 carbon atoms and reactive towards two classes of phenols, one being (A) a phenol of the formula

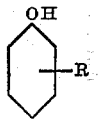

in which R is an aliphatic hydrocarbon radical having at least 4 and not more than 24 carbon atoms and substituted in the 2,4,6 position; the other being (B) a tetrafunctional bisphenol; the ratio of the two classes of phenols employed being so as to contribute one bisphenol residue per resin molecule; (b) a basic hydroxylated secondary monoamine having not more than 32 carbon atoms in any group attached to the amino nitrogen atom and reactive towards formaldehyde; (c) formaldehyde; said condensation reaction being conducted at a temperature sufficiently high to eliminate water and below the pyrolytic point of the reactants and resultants of reaction; with the added proviso that the condensation reaction be conducted so as to produce a significant portion of the resultant in which each of the three reactants have contributed part of the ultimate molecule; with the proviso that the ratio reactants be approximately within the range of 1,3 and 3 to 1,4 and 4 respectively; and with the further proviso that the resinous condensation product resulting from the process be heat-stable.

4. The process of breaking petroleum emulsions of the water-in-oil type characterized by subjecting the emulsion to a demulsifying agent including a synthetic hydrophile product obtained by the process of condensing (a) an oxyalkylation-susceptible, fusible, organic solvent-soluble, water-insoluble, low-stage phenol-aldehyde resin having an average molecular weight corresponding to at least 3 and not over 6 phenolic nuclei per resin molecule; said resin being derived by reaction between an aldehyde having not over 8 carbon atoms and reactive towards two classes of phenols, one being (A) a phenol of the formula

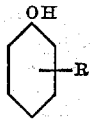

in which R is an aliphatic hydrocarbon radical having at least 4 and not more than 24 carbon atoms and substituted in the 2,4,6 position; the other being (B) a tetrafunctional bisphenol; the ratio of the two classes of phenols employed being so as to contribute one bisphenol residue per resin molecule; (b) a basic hydroxylated secondary monoamine having not more than 32 carbon atoms in any group attached to the amino nitrogen atom and reactive towards formaldehyde; (c) formaldehyde; said condensation reaction being conducted at a temperature sufficiently high to eliminate water and below the pyrolytic point of the reactants and resultants of reaction; with the proviso that the condensation reaction be conducted so as to produce a significant portion of the resultant in which each of the three reactants have contributed part of the ultimate molecule by virtue of a formaldehyde derived methylene bridge connecting the amino nitrogen atom with a resin molecule; with the further proviso that the ratio of reactants be approximately 1,4 and 4 respectively; and with the final proviso that the resinous condensation product resulting from the process be heat-stable.

5. The process of breaking petroleum emulsions of the water-in-oil type characterized by subjecting the emulsion to a demulsifying agent including a synthetic hydrophile product obtained by the process of condensing (a) an oxyalkylation-susceptible, fusible, organic solvent-soluble, water-insoluble, low-stage phenol-aldehyde resin having an average molecular weight corresponding to at least 3 and not over 6 phenolic nuclei per resin molecule; said resin being derived by reaction between an aldehyde having not over 8 carbon atoms and reactive towards two classes of phenols, one being (A) a phenol of the formula

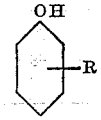

in which R is an aliphatic hydrocarbon radical having at least 4 and not more than 24 carbon atoms and substituted in the 2,4,6 position; the other being (B) a tetrafunctional bisphenol; the ratio of the two classes of phenols employed being so as to contribute one bisphenol residue per resin molecule; (b) a basic hydroxylated secondary monoamine having not more than 32 carbon atoms in any group attached to the amino nitrogen atom and reactive toward formaldehyde; (c) formaldehyde; said condensation reaction being conducted at a temperature sufficiently high to eliminate water and below the pyrolytic point of the reactants and resultants of reaction; with the proviso that the condensation reaction be conducted so as to produce a significant portion of the resultant in which each of the three reactants have contributed part of the ultimate molecule by virtue of a formaldehyde derived methylene bridge connecting the amino nitrogen atom with a resin molecule; with the further proviso that the ratio of reactants be approximately 1, 4 and 4 respectively; with the further proviso that said procedure involve the use of a solvent; and with the final proviso that the resinous condensation product resulting from the process be heat-stable.

6. The process of breaking petroleum emulsions of the water-in-oil type characterized by subjecting the emulsion to a demulsifying agent including a synthetic hydrophile product obtained by the process of condensing (a) an oxyalkylation-susceptible, fusible, organic solvent-soluble, water-insoluble, low-stage phenolaldehyde resin having an average molecular weight corresponding to at least 3 and not over 6 phenolic nuclei per resin molecule; said resin being derived by reaction between formaldehyde and two classes of phenols, one being (A) a phenol of the formula

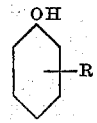

in which R is an aliphatic hydrocarbon radical having at least 4 and not more than 24 carbon atoms and substituted in the 2,4,6 position; the other being (B) a tetrafunctional bisphenol; the ratio of the two classes of phenols employed being so as to contribute one bisphenol residue per resin molecule; (b) a basic hydroxylated secondary monoamine having not more than 32 carbon atoms in any group attached to the amino nitrogen atom and reactive towards formaldehyde; (c) formaldehyde; said condensation reaction being conducted at a temperature sufficiently high to eliminate water and below the pyrolytic point of the reactants and resultants of reaction;

with the proviso that the condensation reaction be conducted so as to produce a significant portion of the resultant in which each of the three reactants have contributed part of the ultimate molecule by virtue of a formaldehyde derived methylene bridge connecting the amino nitrogen atom with a resin molecule; with the further proviso that the ratio of reactants be approximately 1,4 and 4 respectively, with the further proviso that said procedure involve the use of a solvent; and with the final proviso that the resinous condensation product resulting from the process be heat-stable.

7. The process of breaking petroleum emulsions of the water-in-oil type characterized by subjecting the emulsion to a demulsifying agent including a synthetic hydrophile product obtained by the process of condensing (a) an oxyalkylation-susceptible, fusible, organic solvent-soluble, water-insoluble, low-stage phenolaldehyde resin having an average molecular weight corresponding to at least 3 and not over 6 phenolic nuclei per resin molecule; said resin being derived by reaction between formaldehyde and two classes of phenols, one being (A) a phenol of the formula

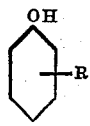

in which R is an aliphatic hydrocarbon radical having at least 4 and not more than 14 carbon atoms and substituted in the 2,4,6 position; the other being (B) a tetrafunctional bisphenol; the ratio of the two classes of phenols employed being so as to contribute one bisphenol residue per resin molecule; (b) a basic hydroxylated secondary monoamine having not more than 32 carbon atoms in any group attached to the amino nitrogen atom and reactive towards formaldehyde; (c) formaldehyde; said condensation reaction being conducted at a temperature sufficiently high to eliminate water and below the pyrolytic point of the reactants and resultants of reaction; with the proviso that the condensation reaction be conducted so as to produce a significant portion of the resultant in which each of the three reactants have contributed part of the ultimate molecule by virtue of a formaldehyde derived methylene bridge connecting the amino nitrogen atom with a resin molecule; with the further proviso that the ratio of reactants be approximately 1,4 and 4 respectively, with the further proviso that said procedure involve the use of a solvent and with the final proviso that the resinous condensation product resulting from the process be heat-stable.

8. The process of breaking petroleum emulsions of the water-in-oil type characterized by subjecting the emulsion to a demulsifying agent including a synthetic hydrophile product obtained by the process of condensing (a) an oxyalkylation-susceptible, fusible, organic solvent-soluble, water-insoluble, low-stage phenolaldehyde resin having an average molecular weight corresponding to at least 3 and not over 5 phenolic nuclei per resin molecule; said resin being derived by reaction between formaldehyde and two classes of phenols, one being (A) a phenol of the formula

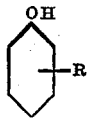

in which R is an aliphatic hydrocarbon radical having at least 4 and not more than 14 carbon atoms and substituted in the 2,4,6 position; the other being (B) a tetrafunctional bisphenol; the ratio of the two classes of phenols employed being so as to contribute one bisphenol residue per resin molecule; (b) a basic hydroxylated secondary monoamine having not more than 32 carbon atoms in any group attached to the amino nitrogen atom and reactive towards formaldehyde; (c) formaldehyde; said condensation reaction being conducted at a temperature sufficiently high to eliminate water and below the pyrolytic point of the reactants and resultants of reaction; with the proviso that the condensation reaction be conducted so as to produce a significant portion of the resultant in which each of the three reactants have contributed part of the ultimate molecule by virtue of a formaldehyde derived methylene bridge connecting the amino nitrogen atom with a resin molecule; with the further proviso that the ratio of reactants be approximately 1,4 and 4 respectively, with the further proviso that said procedure involve the use of a solvent and with the final proviso that the resinous condensation product resulting from the process be heat-stable.

9. The process of breaking petroleum emulsions of the water-in-oil type characterized by subjecting the emulsion to a demulsifying agent including a synthetic hydrophile product obtained by the process of condensing (a) an oxyalkylation-susceptible, fusible, organic solvent-soluble, water-insoluble, low-stage phenolaldehyde resin having an average molecular weight corresponding to at least 3 and not over 5 phenolic nuclei per resin molecule; said resin being derived by reaction between formaldehyde and two classes of phenols, one being (B) a phenol of the formula

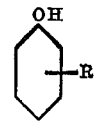

in which R is an aliphatic hydrocarbon radical having at least 4 and not more than 14 carbon atoms and substituted in the 2,4,6 position; the other being (B) a tetrafunctional bisphenol; the ratio of the two classes of phenols employed being so as to contribute one bisphenol residue per resin molecule; (b) a basic hydroxylated secondary amine having at least two alkanol radicals which in turn have not over 8 carbon atoms in each alkanol radical and reactive towards formaldehyde; (c) formaldehyde; said condensation reaction being conducted at a temperature sufficiently high to eliminate water and below the pyrolytic point of the reactants and resultants of reaction; with the proviso that the condensation reaction be conducted so as to produce a significant portion of the resultant in which each of the three reactants have contributed part of the ultimate molecule by virtue of a formaldehyde derived methylene bridge connecting the amino nitrogen atom with a resin molecule; with the further proviso that the ratio of reactants be approximately 1,4 and 4 respectively, with the further proviso that said procedure involve the use of a solvent and with the final proviso that the resinous condensation product resulting from the process be heat-stable.

References Cited in the file of this patent

UNITED STATES PATENTS

| | | |
|---|---|---|
| 2,454,545 | Bock et al. | Nov. 23, 1948 |
| 2,457,634 | Bond et al. | Dec. 28, 1948 |
| 2,558,688 | Landa | June 26, 1951 |
| 2,589,200 | Monson | Mar. 11, 1952 |
| 2,679,484 | De Groote | May 25, 1954 |